United States Patent [19]

Hoffmann

[11] Patent Number: 4,703,914

[45] Date of Patent: Nov. 3, 1987

[54] VALVE JOINT FOR FLUID SYSTEMS

[75] Inventor: Hellmuth Hoffmann, Bergisch Gladbach, Fed. Rep. of Germany

[73] Assignee: Hydrotechnik GmbH, Fed. Rep. of Germany

[21] Appl. No.: 887,971

[22] Filed: Jul. 21, 1986

Related U.S. Application Data

[63] Continuation of Ser. No. 419,558, Sep. 17, 1982, abandoned.

[30] Foreign Application Priority Data

May 13, 1982 [EP] European Pat. Off. ........... 82104164

[51] Int. Cl.$^4$ .............................................. F16K 13/00
[52] U.S. Cl. .................. 251/120; 251/149.6; 251/210; 251/332
[58] Field of Search ................ 137/516.29; 251/149.6, 251/120, 149.1, 210, 211, 332, 360, 363, 333

[56] References Cited

U.S. PATENT DOCUMENTS

| | | | |
|---|---|---|---|
| 2,931,385 | 4/1960 | Carlisle | 137/516.29 |
| 3,104,088 | 9/1963 | Cator | 251/149.6 |
| 3,754,568 | 8/1973 | Gallagher | 137/516.29 |
| 4,253,488 | 3/1981 | Leverberg | 251/149.6 |
| 4,269,389 | 5/1981 | Ekman | 251/149.6 |
| 4,287,914 | 9/1981 | Buseth et al. | 137/614.03 |

FOREIGN PATENT DOCUMENTS 2459042  3/1975  Fed. Rep. of Germany ... 251/149.6

Primary Examiner—Alan Cohan
Attorney, Agent, or Firm—Robert J. Koch

[57] ABSTRACT

A valve joint, in particular, a measuring valve joint for fluid systems with high working pressures, comprises a connector bushing under line pressure having a spring-loaded and mechanically operable check valve in a bore. A cylindrical valve body in the bore presses its packing shoulder against a sealing ring consisting of an elastomeric material in the closed state of the valve. A sealing liner and the valve body form a sealable flow channel arranged in the connector bushing. Further seals are arranged downstream and/or upstream from the sealing ring. Upon the opening of the valve body the further seals terminate their sealing function only after the lifting of the sealing ring from the packing shoulder and preferably in a delayed manner.

26 Claims, 3 Drawing Figures

VALVE JOINT FOR FLUID SYSTEMS

This application is a continuation of application Ser. No. 419,558, filed Sept. 17, 1982 now abandoned.

BACKGROUND OF THE INVENTION

1. Field of the Invention

The invention relates to a valve joint, in particular, valve measuring joints for fluid systems with high operating pressures. The valve joints consist of a connector bushing under line pressure and a spring loaded and mechanically actuated non-return valve arranged in the bore of the connector bushing.

2. Background of the Prior Art

Valve joints of the above-mentioned type serve, for example, to establish testing or measuring connections to pressure lines where, as a rule, the connector bushing having external threads is installed fixedly in the pressure line of, for example, hydraulic or pneumatic systems. For the duration of the testing or measuring operations, a seal nipple in the form of a hollow pin is screwed onto the connector bushing by means of a union nut joined fixedly with a hose. These joints may be connected, for example, under pressure, i.e. without deactivating the installation, through measuring lines with the corresponding measuring instruments. In the case of permanently installed instruments (for example, manometers, selective manometer switches and pressure switches) the flexible measuring lines may be installed in the manner of electric cables, so that expensive pipe installations may be avoided. Effective working pressures may be measured directly on the hydraulic device by means of such measuring connections without the need for the release of vent nuts or pipe joints. Joints of this type are used in numerous structural elements and controls of hydraulic or pneumatic systems. Following the breaking of the connection, a protective cap nut is screwed onto the connector bushing having external threads to prevent the penetration of dirt into the connector bushing and to perform an additional sealing function in the event that a non-return valve installed in the bush is not absolutely tight. Valve joints of the aforementioned type are described, for example, in West German Patent No. 27 56 084, wherein the valve bodies are in the form of cones or spheres. In this known valve joint, the valve body is installed as a non-return valve on a compression spring so as to be movable by the spring. It also has a flow channel on its upper contact end. The valve joint is equipped with sealing and anti-twist gasket, the sealing function whereof is, however, assured only when a corresponding hose or cap nut is screwed tightly onto the connector bush with its seal nipple.

If the cap nut is released or if such a nut does not exist, for example in the case of selective monometer switches, the pressure medium is sealed off only by the corresponding non-return or check valve. Check valves for high pressure valve joints of this type exhibit, for reasons of design, a more or less pronounced tendency to leak depending on the viscosity of the pressure medium. In any case, these check valves cannot be produced under the conditions of assembly-line manufacturing so as to provide tight sealing in actual practice.

For hose lines in general hydraulics and for gas filling devices of hydraulic reservoirs, such configurations are adequate. But even then, there are often complaints concerning leakage if, for example, caps are released in several valve joints simultaneously in order to test several measuring locations in succession with one measuring device. Other complaints of leakage occur in the case of hydraulic reservoirs when gas pressure test devices without the possibility of refilling are used. When the valve joints are employed to monitor installations with combustible gases, leakage can also be a problem.

The use of valve joints of this type in manometer selection switches is entirely impossible because of constant leakage at the fittings not in use. Attempts have already been made in connection with the abovementioned valve joints to equip the check valve with elastic rubber seals, such as conventional O-rings. This had not led to positive results in all cases in spite of adequate initial tightness. With long measuring lines and large dead volumes in manometers (or in the circulation connected with it) and particularly with low visocsity liquids ($\leq 40$ mm$^2$/sec) or in the case of higher operating pressures or in testing devices for hydraulic reservoirs, the elastic rubber gasket is washed out. This is because the high difference in pressure upon the lifting of the valve causes a very strong flow of the medium used against the seal.

SUMMARY OF THE INVENTION

It is the object of the invention to eliminate these difficulties and to provide in particular a valve joint, preferably a valve measuring joint suitable for fluid systems with high operating pressures and media of different viscosities. The valve joint also provides measures to protect a seal consisting of an elastomeric material against cavitation and washouts and to eliminate the effect of large volumes in measuring lines or the like of the circulation connected with them on the elastomeric seal.

This object is attained by a valve joint of the instant invention comprising a cylindrical valve body having in the closed state of the valve, an outer edge and/or frontal surface of a packing shoulder pressing against a sealing ring of an elastomeric material. This forms a sealable flow channel with the connector bushing or a sealing liner arranged in said connector bushing. Further seals are arranged downstream and/or upstream from the sealing ring which terminate their sealing function upon the impact of the valve body only after the sealing ring is lifted from the packing shoulder, preferably in a delayed manner. This measure according to the invention insures that the flow generated by the high difference in pressure immediately after the release of the elastomeric sealing ring from its valve shoulder is throttled and nearly brought to a standstill.

According to the invention, the decrease of the sealing function of the seals arranged downstream and/or upstream from the sealing ring during the process of the impact of the valve body extends over a longer path. In this manner, the seals arranged downstream and/or upstream from the sealing ring are still exercising their sealing function. At the same time, as the result of the shorter stroke of the sealing ring, the downstream or upstream seals are removed from the detrimental effect of a flow that would otherwise be formed. In this fashion such seals are protected against the cavitation or washout caused by the flow.

According to the invention, seals present downstream and/or upstream from the sealing ring have the configuration of throttling paths and/or labyrinth seals. This renders it possible to effect the equalization of pressure in a defined and predetermined manner. Measurements indicate that the effect of the reduction of the velocity of the medium flowing past the seals is usually sufficient to prevent washouts and cavitation of the sealing ring itself.

The seals arranged downstream and/or upstream from the sealing ring are provided in a further advantageous embodiment of the invention with a cavitation and wear resistant gasket located in an annular groove.

The cylindrical valve body has in one preferred embodiment of the invention an axial bore passing into radially oriented bores. The packing shoulder is arranged above the radial bores, followed by the cylindrical throttle path with a conical end piece. The connector bushing in this embodiment has an expanded bore to receive the packing shoulder of the valve body and of the sealing liner.

The connector bushing is equipped in the lower part of its bore with its valve spring resting against a shoulder piece. The upper end of the connector bushing has a flanged ring made after the assembly and securing the sealing liner. This considerably simplifies the installation, as all of the elements may be introduced from one side and the valve and seal system then anchored by the preparation of the flanged ring.

In an advantageous embodiment of the invention, the sealing liner is in several parts with the lower part having an annular ridge. The radially outward side of the annular ridge forms a gasket chamber with the inner wall of the connector bushing. The gasket chamber receives the sealing ring. The radially inner side of the gasket chamber represents the outer limit of the seal.

In another advantageous manner, the annular ridge has the configuration of a stop for the packing shoulder of the valve body. The packing shoulder presses with its outer edge and/or its frontal surface in the closed state of the valve against the sealing ring. The axially outer surface of the packing shoulder forms an annular channel with the expanded bore of the connector bushing. The upper part of the sealing liner forms an annular groove to receive an O-ring with the lower part of the sealing liner. A nipple of a protective union cap nut rests against the O-ring in the closed state of the valve.

BRIEF DESCRIPTION OF THE DRAWINGS

The invention will become more apparent from the embodiments hereinafter presented and shown in the drawings.

In the drawings.

DETAILED DESCRIPTION OF THE PREFERRED EMBODIMENTS

Figure 1:
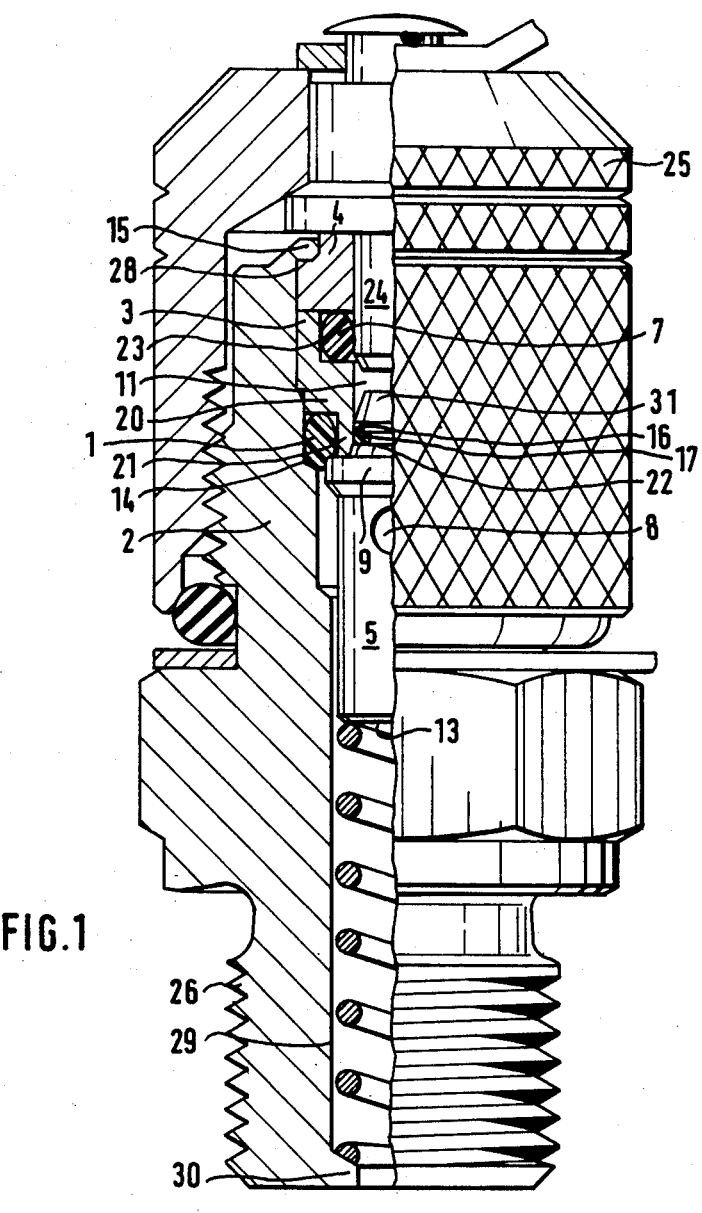
FIG. 1 shows a valve joint at a scale of 5:1 in a partial cross section through the central axis with the valve in the closed state.
Figure 2:
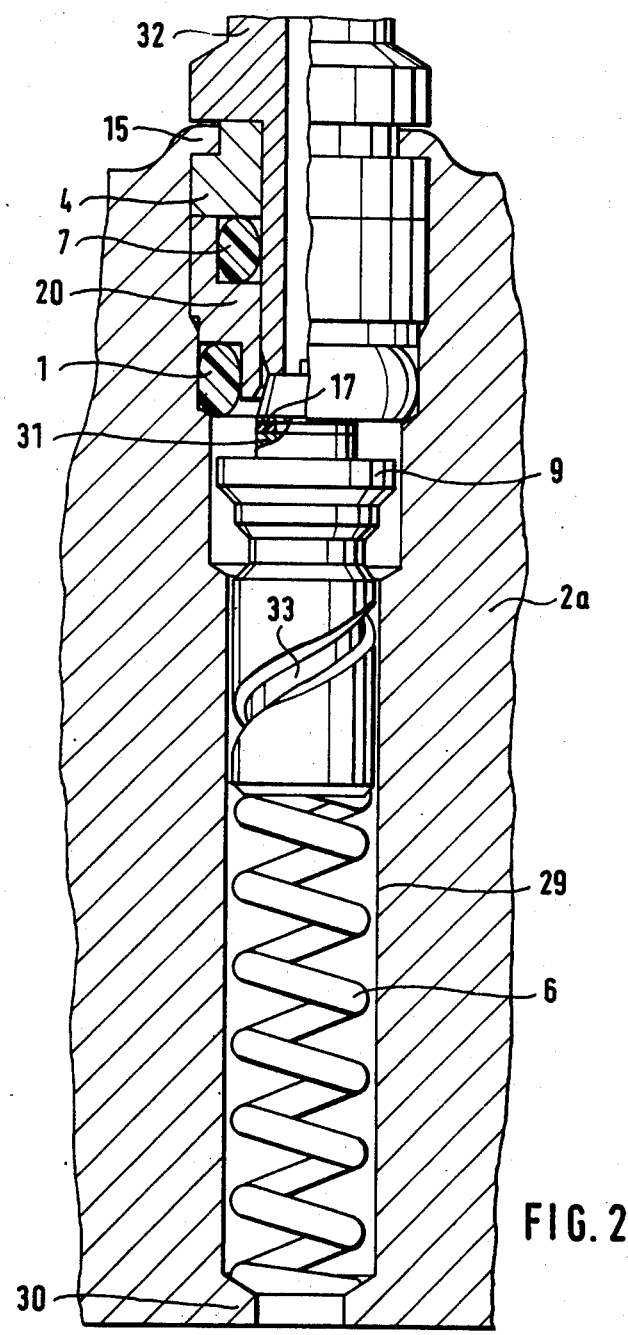
FIG. 2 illustrates a valve joint in a manometer selection switch in the open state and FIG. 3 shows a further embodiment of a valve joint at a scale of 5:1 in a partial cross section through the central axis and with the valve in the closed state.

As seen in FIG. 2, the manometer selection switch housing 2a and in FIG. 1, the connector bushing 2 are provided respectively with a bore 29. The bore receives the valve spring 6, the valve body 5 located above it and a sealing liner 3 consisting of two parts. The connector bushing 2 is equipped at its lower end with external threads 26 so that it may be connected in a simple manner with the hydraulic or pneumatic system. In a selection switch housing 2a, according to FIG. 2, the external threads are eliminated.

The valve body 5 has an axial bore 13 in the embodiment shown in FIG. 1. The axial bore 13 passes into radially oriented bores 8.

The embodiment according to FIG. 2 has a helical groove 33 which is favorable from a manufacturing standpoint instead of the axial bore.

Above the plurality of radial bores 8 or the helical groove 33, the valve body 5 is equipped with a packing shoulder 9 which is followed by a seal in the form of a throttling path 16 and a conical end piece 31.

In the lower part of its bore 29, the connector bushing 2 is equipped with a shoulder piece 30 against which the valve spring 6 rests. The upper end of the connector bushing 2 has a flanged ring 15 which conforms to the assembly and which secures the sealing liner 3. These layout measures make it possible to advantageously effect the mounting of the entire system from one side, whereby the spring 6, the valve body 5 and the sealing liner 3 are introduced in succession. Following this assembly operation, the flanging ring is arranged so that the entire system is immobilized in a simple manner. In order to insure the simple installation of the O-rings required, the sealing liner 3 is in several parts, with the lower part 20 having an annular ridge 21, the radially outer side forms a gasket chamber with the inner wall of the selection switch housing 2a and the connector bushing 2. The gasket chamber receives the sealing ring 1. The radial inner side of the annular ridge 21 forms a further seal with the valve body 5 above its packing shoulder 9. This further seal is in the form of a cylindrical throttling path 16 with a throttling gap of a predefined length and width.

The annular ridge 21 simultaneously serves as a stop for the packing shoulder 9 of the valve body 5 in the closed state of the valve. In this closed state, the packing shoulder 9 is pressing with its frontal surface or outer edge against the sealing ring 1, located in the gasket chamber 14. The axially oriented outer surface of the packing shoulder 9 is dimensioned so that it forms an annular gap together with the expanded bore of the connector bushing 2. This annular gap passes into an annular channel 11. The annular channel 11 is connected through the radial bores 8 and the axial bore 13 or the helical groove with the bore 29 of the connector bushing 2 in flow.

The cylindrical throttling path 16 of the valve body 5 may in a special embodiment of the invention contain an annular groove to receive a sealing ring 17 of a plastic material. Polytetrafluoroethylene reinforced with mineral fibers is a preferred material. In the alternative, the annular groove may receive a piston ring of gray cast iron. These sealing rings are resistant against cavitation and wear.

The upper part 4 of the sealing liner 3 together with the lowerpart 20 form an annular groove 23 which receives an O-ring. In the closed state of the valve as shown in FIG. 1, a nipple 24 of a protective union nut 25 rests against the O-ring.

As seen in FIG. 1, the upper frontal surface or the outer edge of the packing shoulder 9 presses in the closed state of the valve against the sealing ring 1. The sealing ring consists of an elastomeric material. Downstream from the sealing ring 1, the valve body 5 forms a gasket with the annular ridge 21 of the sealing liner 3. The gasket takes the form of a throttling path 16.

When the valve body 5 is lowered (in the drawings) with the aid of the hollow pin 32, the sealing ring 1 and the shoulder 9 of the valve body 5 are separated axially. The gasket 16 in the form of a throttling path maintains its function until the annular ridge 21 and the conical part 31 of the valve body 5 become separated axially from each other.

As may be seen particularly in FIG. 2, the decrease of the sealing function of the gasket 16 takes place over a long path so that gasket 16 produces a sealing effect throughout the path. That is, the gasket 16 is arranged in this example upstream from the sealing ring 1, during the downward (in the drawings) motion of the valve body 5 with the aid of the hollow pin 32 compared to the decrease in the sealing function of the sealing ring 1. The longer path is defined by the height of the annular ridge 21. In the gasket 16 in the form of a throttling path, an annular groove 22 may be provided for special requirements in which a gasket 17 is located. The latter is resistant to cavitation and wear. This gasket serves to equalize the manufacturing tolerances of the metal parts.

The prevention of a flow or the reduction of the velocity of the medium flowing past the seal 1 prevents the washout or cavitation of this seal. This results in the fact that the entire sealing system is applicable at extremely high pressure and even for gases wherein the correlation and configuration of the different seals insures an extremely long service life.

Figure 3:
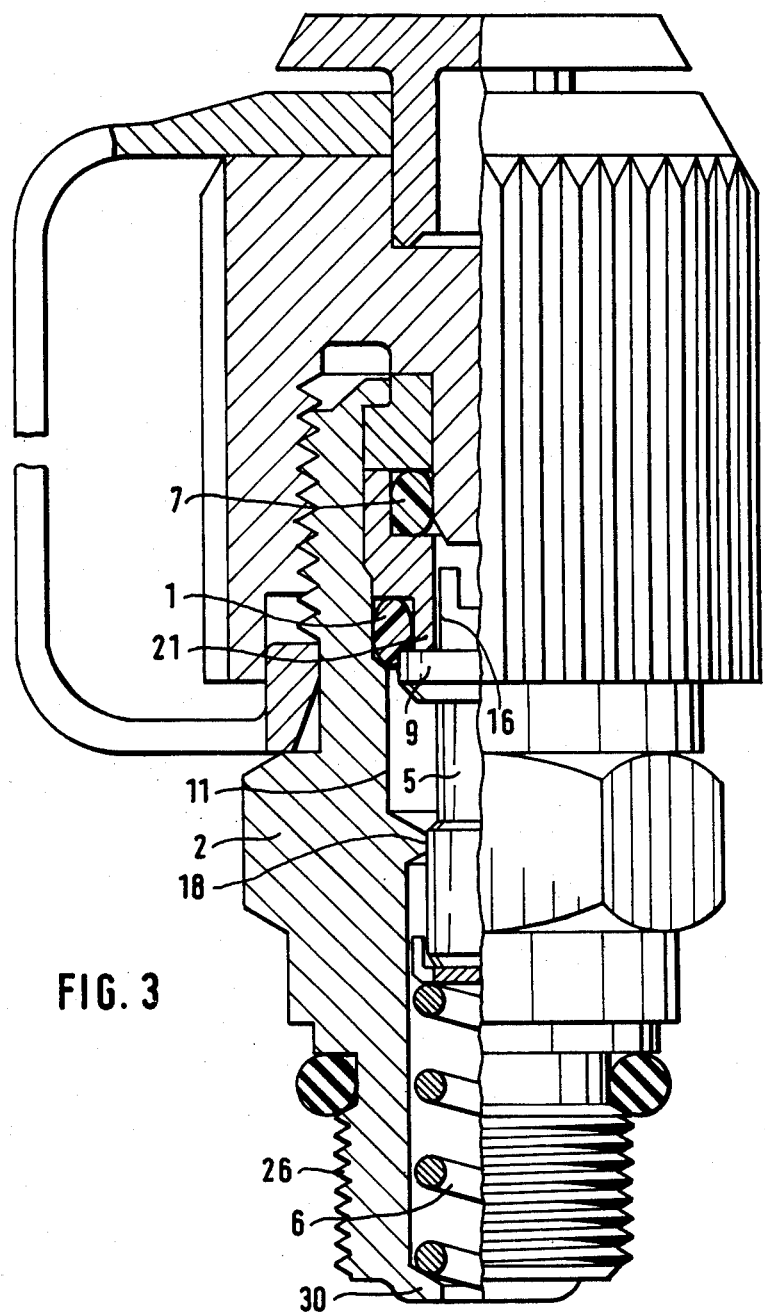

FIG. 3 shows a further embodiment of the invention in which, as in the form according to FIG. 1, a cylindrical valve body 5 is present. The valve body presses with the frontal surface and/or the outer edge of its packing shoulder 9, in the closed state of the valve against a sealing ring 1. The sealing ring is made of an elastomeric material. The valve body 5 forms a sealable flow channel 11 together with the connector bushing 2 with a further seal 18 being arranged upstream from the sealing ring 1. Upon the opening of the valve body 5, the further seal 18 terminates its sealing function in a delayed manner only after the sealing ring 1 and the packing shoulder 9 have become separated. The embodiment according to FIG. 3 represents a construction in which seals are provided both upstream and downstream of the seal 1, otherwise this embodiment displays the same mode of operation as the embodiment according to FIGS. 1 and 2.

In an embodiment not shown in detail, the embodiments shown in FIGS. 1, 2 and 3 may be combined with each other so that further seals may be arranged both downstream and upstream with respect to the sealing ring 1. These in turn may be designed as combination seals, for example, a throttling path or a labyrinth seal in combination with sealing rings. In all of the forms of embodiment, the sealing ring 1 is made of an elastomer, while the gaskets used in the seals 16, 17 and 18 are made of a cavitation resistant material.

The above description describes a preferred embodiment of the invention. It is to be understood however, that the invention is not limited to any single embodiment or feature, but should be construed to cover all modifications and alternative embodiments falling within the scope of the invention as defined by the claims which follow.

What is claimed is:
1. A valve joint for fluid systems comprising:
a connector bushing having a bore;
a sealable flow channel in said bore defined by a sealing liner and a cylindrical valve body;
a packing shoulder extending circumferentially from said cylinder valve body;
means for sealing said flow channel, said means including an elastomeric sealing ring for providing sealing engagement between said sealing liner and said packing shoulder, and at least one secondary sealing member for providing a seal between said sealing liner, said valve body at a distance from said elastomeric sealing ring;
wherein said sealing liner exhibits multiple portions and is located in an upper part of said connector bushing, for housing said elastomeric sealing ring and said secondary sealing member, wherein a lower portion of said multiple portion sealing liner comprises an annular shoulder exhibiting a radial outer side which forms a gasket chamber with an inner wall of said connector bushing to receive said elastomeric sealing ring, and a radial inner side forming a throttle path in said flow channel;
wherein said annular shoulder is arranged as a stop for said packing shoulder of said valve body;
an annular inner circumferential recess in said multiple portion sealing liner at a juction between said lower portion and an upper portion wherein said lower portion defines a lower edge of said recess and said upper portion defines an upper edge of said recess;
an O-ring arranged in said inner circumferential recess; and
wherein said at least one secondary sealing member is constructed and arranged to at least partially maintain a seal in said flow channel after disengagement of said elastomeric sealing ring and said packing shoulder due to movement of said valve body during an opening process of said valve joint, said secondary sealing member becoming fully disengaged to permit full fluid flow after said valve body has moved a predetermined distance during said opening process.

2. The valve joint for fluid systems of claim 1 wherein said fluid system is a high pressure system and said valve joint is under a high line pressure.

3. The valve joint for fluid systems of claim 2 further comprising means for biasing said packing shoulder of said cylindrical valve body against said elastomeric sealing ring.

4. The valve joint for fluid systems of claim 3 wherein said biasing means is a spring loaded mechanically actuable check valve.

5. The valve joint for fluid systems of claim 4 wherein said packing shoulder has a frontal surface and an outer edge and wherein said edge or said surface engages said elastomeric sealing ring.

6. The valve joint for fluid systems of claim 5 further comprising a plurality of secondary sealing members.

7. The valve joint for fluid systems of claim 6 wherein said plurality of said secondary sealing members are arranged at a distance from the elastomeric sealing ring along a flow channel.

8. The valve joint for fluid systems of claim 6 wherein one of said secondary sealing members is arranged at a distance upstream from said elastomeric sealing ring and one of said secondary sealing members is arranged at a distance downstream from said elastomeric sealing ring.

9. The valve joint for fluid systems of claim 1, 7 or 8 wherein a reduction in the sealing effect of said secondary sealing member during the opening process of the cylindrical valve body occurs as said body moves over a longer path compared to a reduction in the sealing effect of the elastomeric sealing ring.

10. The valve joint for fluid systems of claim 9 wherein said at least one secondary sealing member has the configuration of throttling paths.

11. The valve joint for fluid systems of claim 10 further comprising an annular groove in said valve body and a cavitation and wear resistant gasket located in said annular groove.

12. The valve joint for fluid systems of claim 11 wherein said valve body exhibits an axial bore passing into a plurality of radially oriented bores.

13. The valve joint for fluid systems of claim 12 wherein the packing shoulder is arranged between said radial bores and said annular groove with a conical end piece and wherein said connector bushing has an expanded bore to receive the packing shoulder.

14. The valve joint for fluid systems of claim 13 further comprising a shoulder piece on said connector bushing in the lower part of said bore.

15. The valve joint for fluid systems of claim 14 wherein a valve spring is biased against said shoulder piece.

16. The valve joint for fluid systems of claim 15 further comprising a flanged ring at the upper end of said connector bushing said flanged ring securing the sealing liner.

17. The valve joint for fluid systems of claim 16 further comprising a nipple and a protective union cap nut.

18. The valve joint for fluid systems of claim 17 wherein said nipple and said protective union cap nut engage said O-ring when said valve is in its closed position.

19. The valve joint for fluid systems of claim 1 wherein said valve body exhibits an axial bore passing into a plurality of radially oriented bores.

20. The valve joint for fluid systems of claim 19 wherein the packing shoulder is arranged between radial bores said annular groove with a conical end piece and wherein said connector bushing has an expanded bore to receive the packing shoulder.

21. The valve joint for fluid systems of claim 20 further comprising a shoulder piece on said connector bushing in the lower part of said bore.

22. The valve joint for fluid systems of claim 21 wherein a valve spring is biased against said shoulder piece.

23. The valve joint for fluid systems of claim 22 further comprising a flanged ring at the upper end of said connector bushing, said flanged ring securing the sealing liner.

24. The valve joint for fluid systems of claim 23 wherein an axially outer surface of said packing shoulder forms an annular channel with said expanded bore of the connector bushing.

25. The valve joint for fluid systems of claim 24 further comprising a nipple and a protective union cap nut.

26. The valve joint for fluid systems of claim 25 wherein said nipple and said protective union cap nut engage said O-ring when said valve is in its closed position.

* * * * *